United States Patent
Aswell et al.

(10) Patent No.: US 6,553,437 B1
(45) Date of Patent: Apr. 22, 2003

(54) ADDRESSING AND COMMUNICATION FOR MULTIPLE-CHIP OPTICAL SENSOR ARRAYS

(75) Inventors: Cecil J. Aswell, Organgevale, CA (US); Eugene G. Dierschke, Dallas, TX (US); John Hull Berlien, Jr., Plano, TX (US); Carlo S. Strippoli, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/334,205

(22) Filed: Jun. 15, 1999

Related U.S. Application Data
(60) Provisional application No. 60/089,325, filed on Jun. 15, 1998.

(51) Int. Cl.⁷ .......................... G06F 13/10; G06F 13/12
(52) U.S. Cl. .................. 710/36; 710/3; 710/8; 710/9; 710/10; 710/41
(58) Field of Search .............................. 710/3, 8, 9, 10, 710/36, 41

(56) References Cited

U.S. PATENT DOCUMENTS

| | | | | |
|---|---|---|---|---|
| 4,689,786 A | * | 8/1987 | Sidhu et al. | 340/825.52 |
| 5,148,389 A | * | 9/1992 | Hughes | 710/104 |
| 5,475,854 A | * | 12/1995 | Thomsen et al. | 710/22 |
| 5,586,269 A | * | 12/1996 | Kubo | 340/3.5 |
| 6,290,131 B1 | * | 9/2001 | Kolis et al. | 235/462.01 |

* cited by examiner

*Primary Examiner*—Jeffrey Gaffin
*Assistant Examiner*—Rehana Perveen
(74) *Attorney, Agent, or Firm*—April M. Mosby; Wade James Brady, III; Frederick J. Telecky, Jr.

(57) ABSTRACT

A technique for serially controlling an array of optical sensor chips over a pair of signal lines. After broadcasting an initializing reset command to all chips over serial lines, a determine-address command is broadcast to commence unique address determination. On subsequent clock signals, each chip locks its address into an on-board register. Following this process, each chip can be addressed individually. Subsequently, when each array chip is directed to read data out, the data is output to a single common bus line to the controller. Alternatively, individual chip outputs may be connected directly to the controller, or the outputs of odd and even chip pairs may be tied together for broadcast readout of all odd chips or all even chips.

33 Claims, 6 Drawing Sheets

ADDRESSING AND COMMUNICATION FOR MULTIPLE-CHIP OPTICAL SENSOR ARRAYS

This application claims the benefit of Provisional application No. 60/089,325 filed Jun. 15, 1998.

BACKGROUND AND SUMMARY OF THE INVENTION

The present invention relates to communications in linear optical array chips.

Background: Linear Optical Arrays

Linear optical arrays consisting of multiple sensor chips and having digital I/O need a method of communicating with each chip in the array. Since there may be many chips in an array, it is preferable (consistent with bandwidth requirements) to use serial I/O in order to reduce the number of lines used for communication between the sensor chips and the control circuitry. It is also desirable to further reduce pin count and circuitry by using some type of addressing scheme, and to multiplex several serial I/O lines into common I/O pins in the control chip. This can be accomplished by using separate address decoding and chip select pins, or by embedding address information in the serial control stream. Embedding the chip address in the serial control stream in turn requires each chip connect to a serial I/O to have a unique address. A problem is how to establish the address of each chip in an array.

Addressing and Communications for Multiple-Chip Optical Sensor Arrays

The present application discloses a communication and addressing technique in optical linear array chips whereby no chip select pins and associated decoding are required. Additionally, no pin programming or external hardware is required to establish addresses. The solution uses a tri-state output for the serial digital outputs of the chips in the array. A single line accommodating serial digital input data connects to all chips in a parallel fashion. The daisy-chain configuration is used to establish unique addresses for each chip in the array so that no external chip select decoding or pin programming is required. The innovative architecture offers addressing of optical sensor chips, and automatic address resolution among multi-chip arrays. Therefore, since chip addresses are determinative, communications to the sensor chips may be in the format of a general broadcast to all chips, or perhaps directed commands to specific chips. This permits array control circuitry to use a single serial input line and a single serial output line for communicating with all chips in an array. Another variation is to use odd and even address recognition. This permits all respective devices designated odd or even to respond to a command simultaneously. Furthermore, the output pins of the chips in the array can be tied together in pairs and respond to commands directed to odd or even addresses. This can be accomplished by recognizing addresses greater than some arbitrary number as either odd or even addresses. By using stop bits and start bits for framing the information to and from the devices, problems with timing are removed. Therefore, communication with individual chips within a multi-chip array with a single serial input may require only half as many serial outputs.

Advantages of the disclosed methods and structures include minimizing hardware and thus pin counts.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Preferred Embodiment

Figure 1:
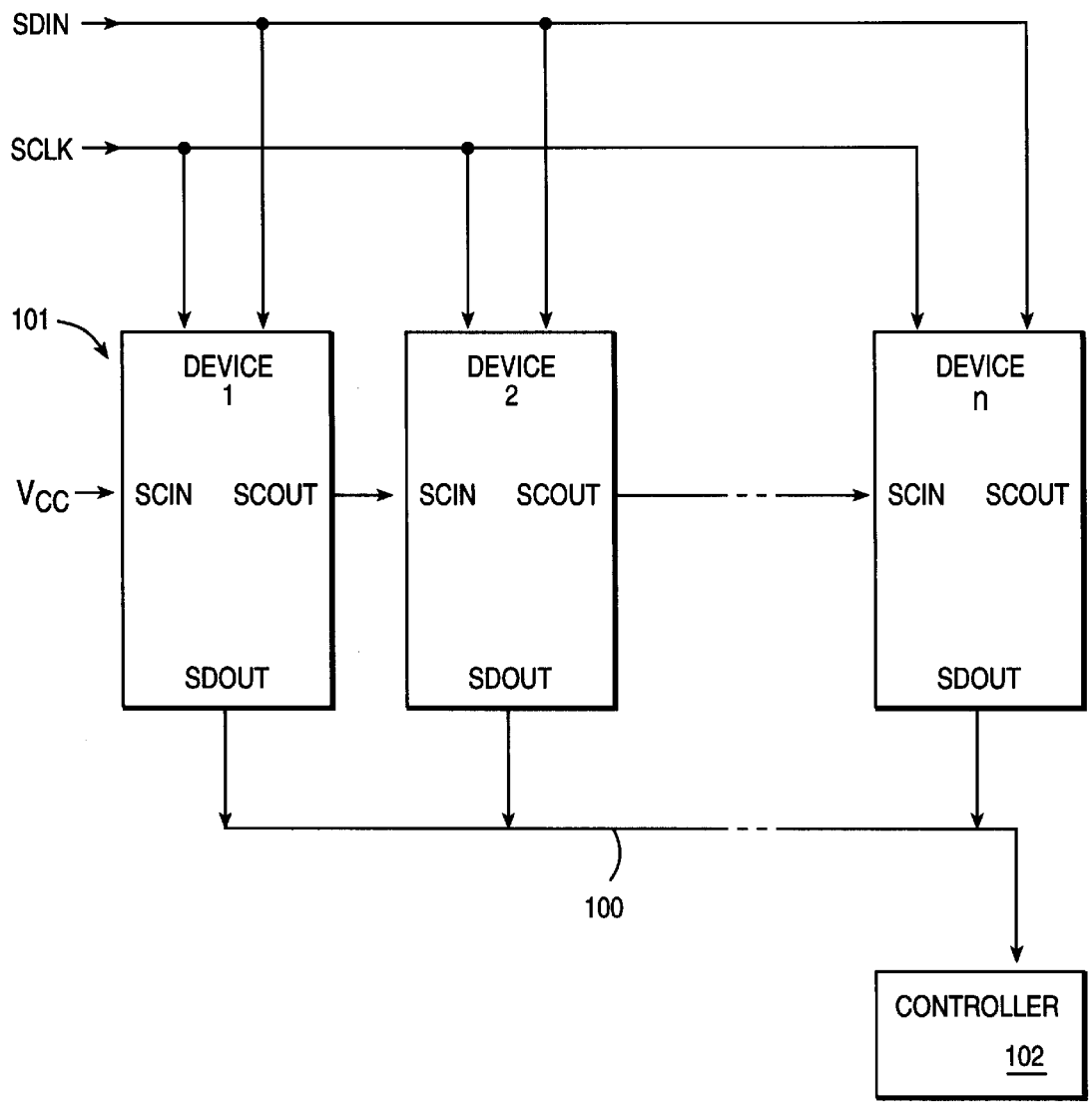
FIG. 1 shows a block diagram of a preferred embodiment.

FIG. 1 is a block diagram of a preferred embodiment. In this embodiment, a single serial input line SDIN connects in parallel to all chips and provides command access to each chip 101 in the optical array. Furthermore, data is transmitted from each chip through their respective serial data output pins SDOUT to a common serial data output line 100. (Since the chip provides a tri-state output at the SDOUT pin, chip outputs may be tied together to a common bus.) Therefore, only a single serial output line is required. The data line may eventually connect to a controller 102 for further processing of the data. This embodiment introduces a substantial savings in chip real estate with the reduced number of signal lines required for controlling the optical sensor chips. Information received by each chip in the array over the serial data input line SDIN is synchronized with a clock signal SCLK. The clock signal SCLK is the clock input for both SDIN and SDOUT. (Data is clocked in at input SDIN on the rising edge of the SCLK signal, and clocked out at output SDOUT on the falling edge of the same SCLK signal.) The serial data out pins SDOUT may be programmed to be continuously active, or to have a high impedance output to permit multiplexing of the SDOUT signals onto common busses. Each device in the array contains an address register which contains that chip's address.

All devices in the array correspond to two types of commands: broadcast and directed. A broadcast command is one which is acted on by any chip. A directed command is acted on only by chips which have an address corresponding to the address imbedded in the serial input stream. The commands of particular interest are the reset address (RESET) and the determine address (DETAddr) commands. These are both broadcast commands. When the RESET command is issued, all devices in the array reset their address registers to zero. Any values that were being held in the array's sample-and-hold circuits are lost.

The DETAddr command has two purposes: determine the device's unique address, and optionally pass the serial clock input at terminal SCIN to the serial data output SDOUT (input SCIN is provided for daisy-chain configurations). When the DETAddr command is sent out via the serial data input line SDIN, all devices initiate a determine-a-unique-address cycle. Following this cycle, each device has established a unique address, and therefore each chip can be addressed individually. More specifically, when all devices are reset, the first device retains its SCIN at a high level, since it is connected to Vcc. The serial clock output SCOUT of Device 1 and all subsequent chips in the array go low. On the next one or more clock cycles, the high level of the SCIN input of Device 1 is clocked through to the SCOUT output, locking the chip address into an on-board register. Therefore, the address of Device 1 is now determined. Addressing moves on to Device 2, where during the next one or more clock cycles, the high level SCOUT output of the previous chip (Device 1) is now clocked through the Device 2 chip, locking in its address into its on-board register. The process continues until all device addresses have been determined and fixed in respective on-board registers. Once the address resolution sequence has been accomplished, the SCIN state is ignored, and data appearing on the SCIN pin is clocked out on the SDOUT pin. Consequently, when a particular device in the array is sent a directed command to read out its information, the information is read out of that chip's SDOUT output. The output of the final device is also connected to pass the data to a controller. By framing data to and from the devices with start and stop bits, timing problems are resolved.

TSL2301 Linear Optical Sensor

Figure 2:
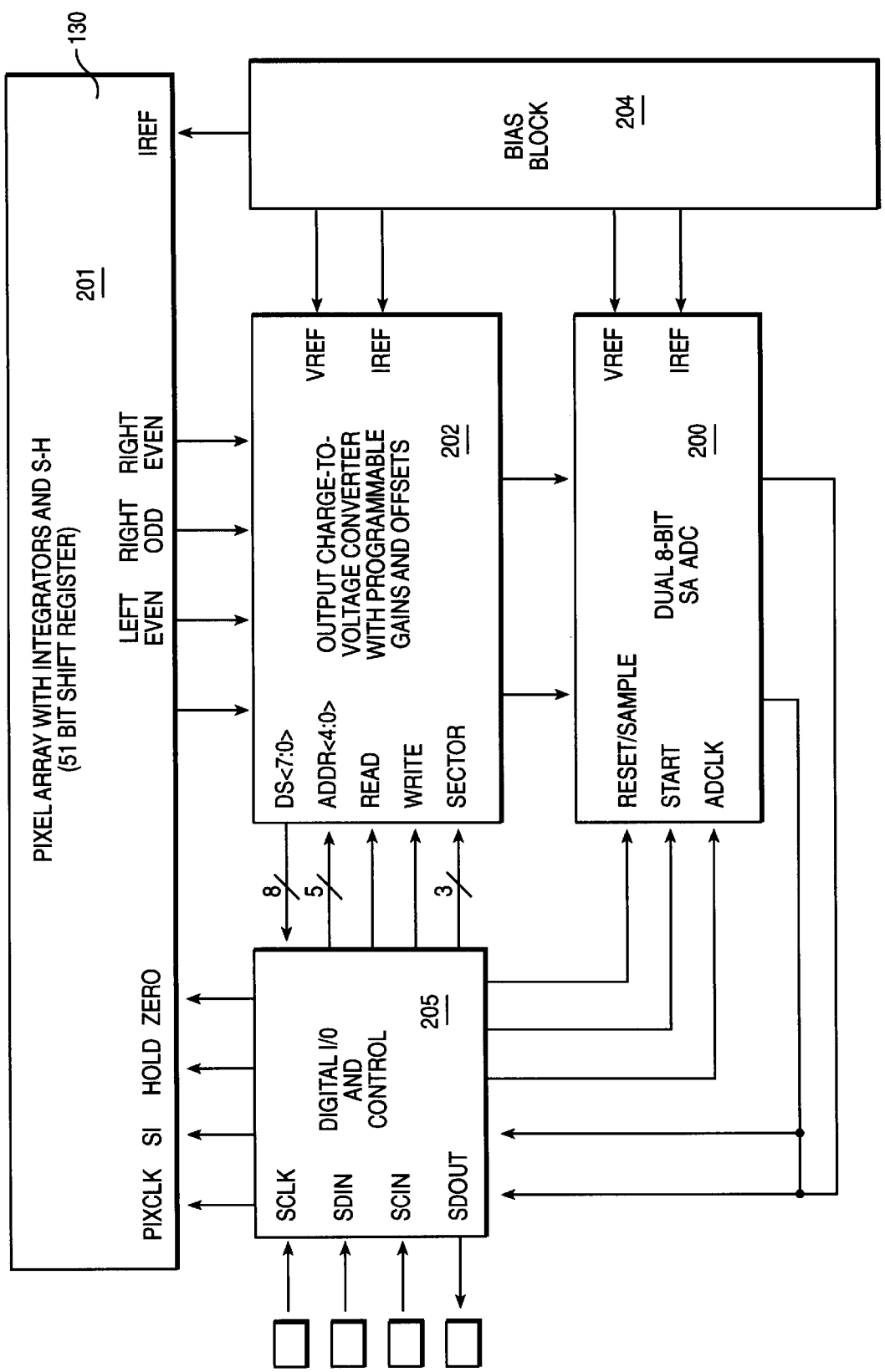
FIG. 2 shows a block diagram of a TSL2301 Linear Optical Sensor.

FIG. 2 shows a block diagram of a TSL2301 Linear Optical Sensor chip. The innovative control technique is applicable to, for example, the TSL2301 Linear Optical Sensor Array manufactured by Texas Instruments. The TSL2301 is a linear (102×1) 300 dpi optical sensor array with an integrated 8-bit ADC 200, and is intended for high performance scanner applications. Light energy impinging on a photodiode of a pixel of the optical array 201 generates photocurrent, which is then integrated by active integration circuitry associated with that pixel. During the integration period, a sampling capacitor connects to the output of the active integrator through an analog switch. A multiplicity of matched capacitors provide voltages which are multiplexed through the analog switch. The amount of charge accumulated at each pixel is directly proportional to the light intensity on that pixel and to the integration time. Integration, sampling, output, and reset of the integrators are performed by the control logic 205 in response to commands input via the SDIN connection. Reading the pixels causes the sampled value of each pixel to be converted to an 8-bit digital format and output on the SDOUT pin. The ADC 200 has a high-speed sampling circuit such that the next precharge/evaluation cycle of the charge-coupled amplifier can take place during analog-to-digital conversion. The charge-coupled amplifier located in the charge-to-voltage converter 202 is precharged to the ADC reference so that with no charge input (corresponding to zero voltage on the sampling capacitor being converted), the one's complement output of the converter is zero. The amplifier is also autozeroed during the precharge cycle. The TSL2301 also comprises a 5-bit gain register and an 8-bit offset register. Voltage and current biases are provided to the array 201, the ADC 200, and the charge-to-voltage converter circuitry 202 by a bias circuit 204. Offset correction is performed in the analog domain prior to digital conversion. Offset voltage proportional to the ADC reference is used so that the driving amplifier does not have to drive to zero volts to utilize the full range input of the ADC 200. (Note that this offset has nothing to do with the offset DAC used to correct for offsets of V1, V2, . . . VN from the pixel electronics.) The pixel array 201 is divided into 3 zones of 34 pixels each. There is a separate offset DAC for each of the three zones for correcting dark signal levels. A programmable gain amplifier is used for convenient amplifier control. A separate gain DAC for the programmable gain amplifier is used for each of the three zones. Data communication is accomplished through a three-wire serial interface.

Figure 1A:
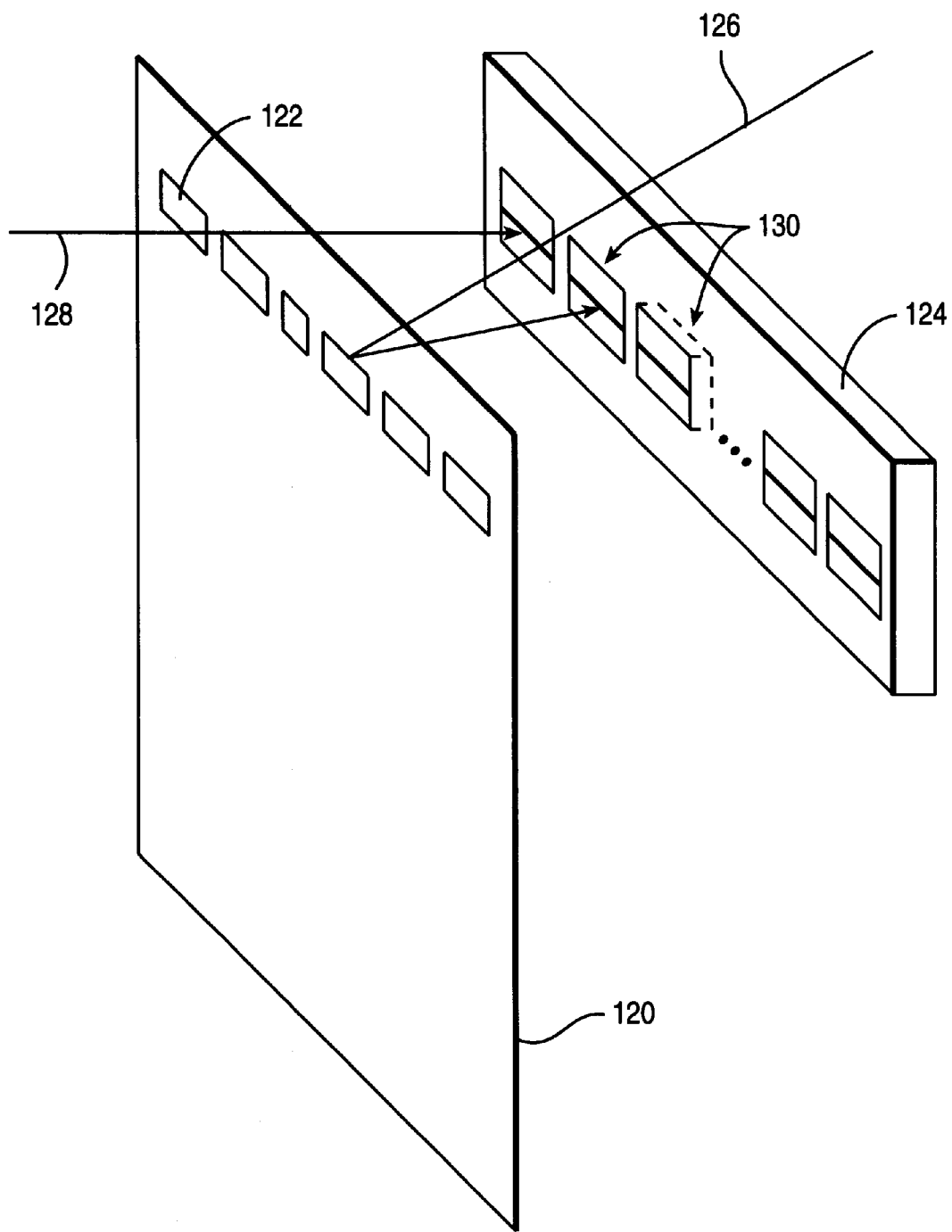
FIG. 1A shows an implementation of the preferred embodiment in a scanner.

FIG. 1A shows an implementation of the preferred embodiment in a scanner. A piece of paper 120 containing markings 122 is being scanned by a scanner 124. The scanner 124 may be, for example, be a small scanning system comprising a single chip, a handheld scanner comprising a small number of chips, or even a larger scanner comprising a large number of chips used for larger image scanning jobs. Light energy 128 may be projected through the markings 122 on the paper, or perhaps reflected light 126 may be used to illuminate the markings 122 for detection by the sensors 130 of the scanner 124. In this particular embodiment, the scanner 124 may comprise a number of sensor chips 130 placed linearly in a single row. Other configurations may be employed where several rows of sensor chips 130 may be used to perform the scanning operation.

Figure 1B:
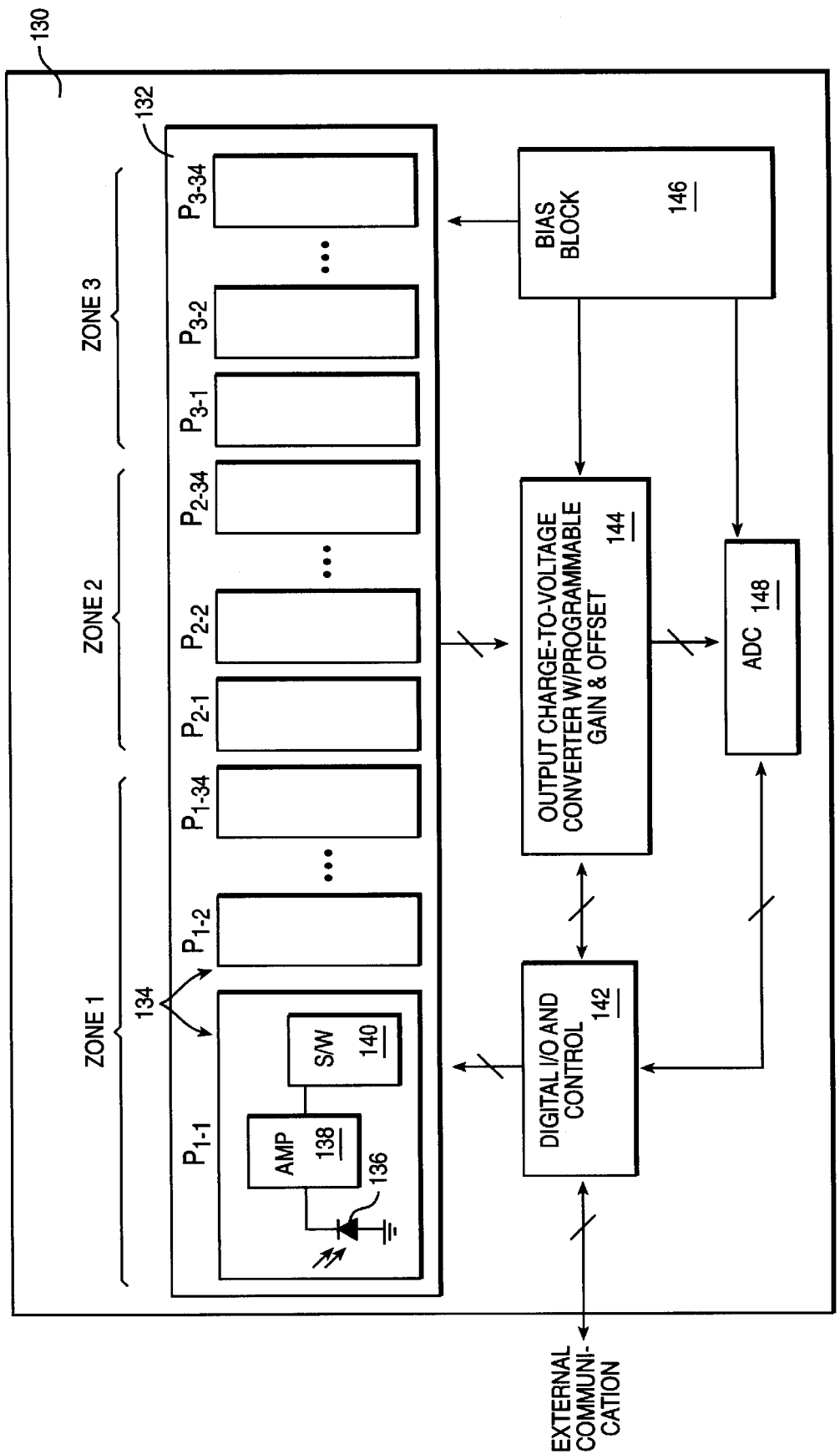
FIG. 1B shows a block diagram of a sensor chip used in the scanner of FIG. 1A.

FIG. 1B shows a block diagram of a sensor chip used in the scanner of FIG. 1A. The chip 130 comprises, in this embodiment, a 102×1 linear array 132 of pixels 134 (Px-y, where x=zone, y=pixel of the respective zone). The array 132 is divided into three zones of 34 pixels each. Zone 1 contains 34 pixels designated P1-1 to P1-34, Zone 2 comprises 34 pixels designated P2-1 to P2-34, and Zone 3 comprises 34 pixels designated P3-1 to P3-34. Each pixel 134 comprises a photosensor 136, a charge integrator/amplifier 138, and a sample-hold circuit 140. The chip 130 also includes additional support circuitry for controlling and processing the photo signals. The digital I/O and control circuitry 142 provides a three-wire serial interface to external communications and also control function for all on-board circuits. A charge-to-voltage converter circuit 144 receives the pixel signal and conditions the signal for the ADC 148. It also provides a programmable gain and offset capability for each pixel zone. A bias block 146 provides voltage biasing for the pixel array circuitry 132, the ADC circuitry 148, and the charge-to-converter circuitry 144.

Alternative Embodiment: Chip Outputs Paired

Figure 3:
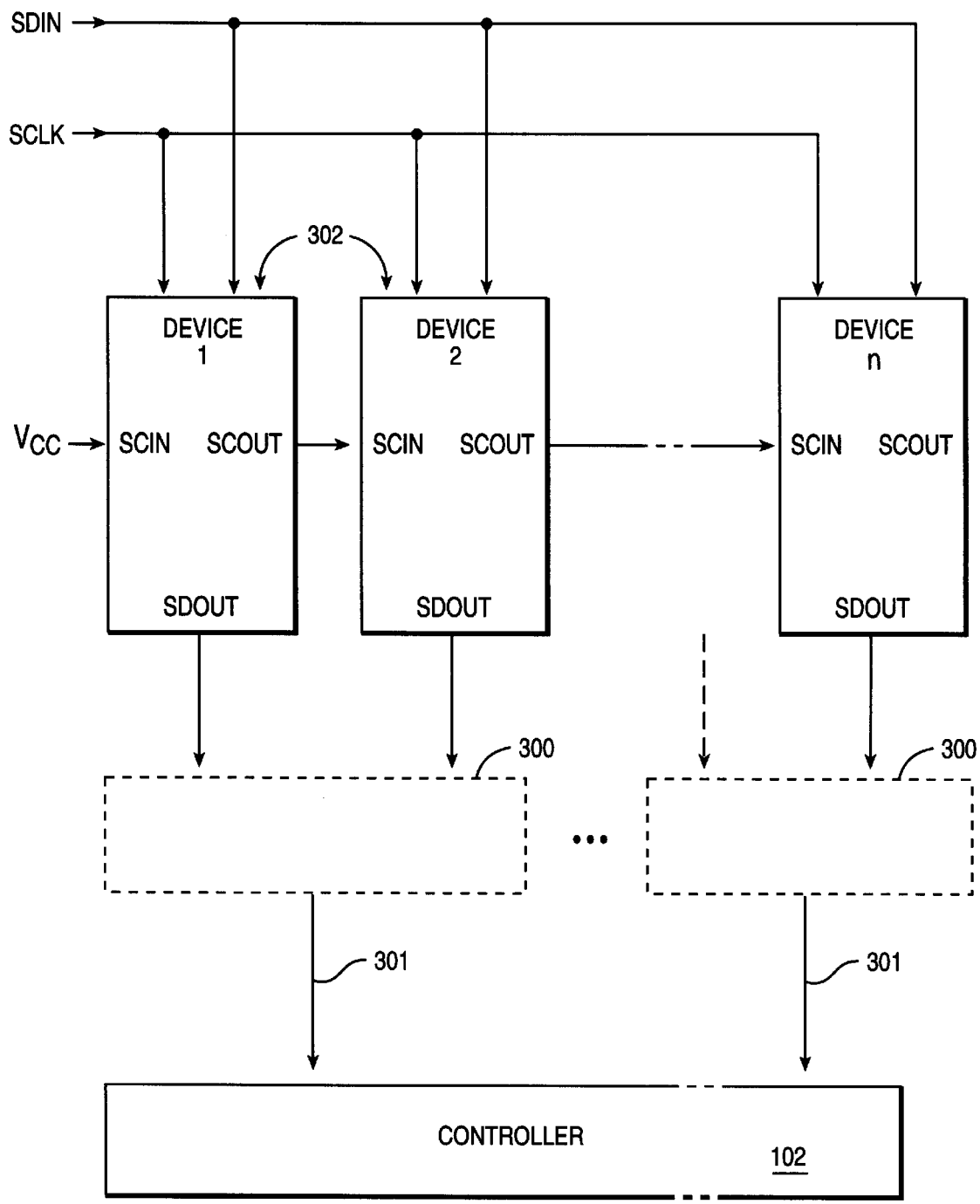
FIG. 3 shows an alternative embodiment with paired outputs.

Alternatively, as shown in FIG. 3, a circuit 300 could provide a common output 301 among pairs of array chips 302. Each pair 302 may comprise, for example, one chip with an odd address and the other chip with an even address. In this scenario, a broadcast command may communicate simultaneously only with the even chips of all array pairs (e.g. address 128 is recognized as a valid address by all even numbered devices), or perhaps only the odd chips (e.g. address 129 is recognized as a valid address by all odd numbered devices). The common data output line 301 may connect directly to a controller 102 for further processing of the data. In this embodiment, only half the total number of output data lines are required to be implemented for connecting to the controller 102.

Other features and details which are also contemplated for use in the preferred embodiments, but which are not necessary for practice of the claimed inventions, are disclosed in the following co-pending applications:

Ser. No. 60/089,330—"Charge-Coupled Amplifier and Converter with Matched Offsets"; and Ser. No. 60/089,231—"Optical Sensor Array With Zone-Programmable Gain and Offset". Both of these are commonly owned with the present application, and have effective filing dates which are simultaneous with that of the present application, and are herein incorporated by reference.

Alternative Embodiment with Individual Chip Outputs to Controller

Figure 4:
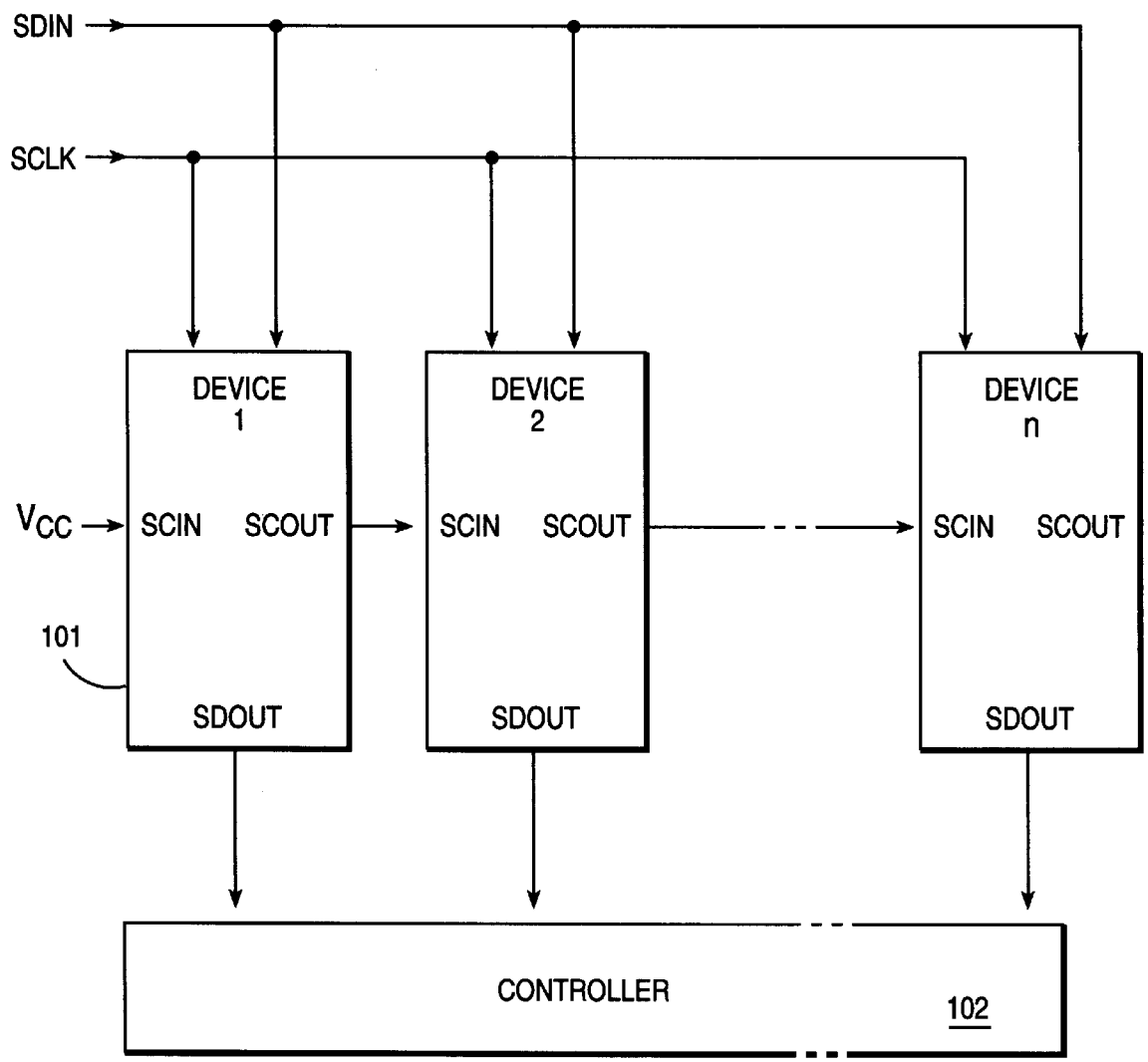
FIG. 4 shows another alternative embodiment where chip outputs are connected separately to the controller.

FIG. 4 shows another alternative embodiment where individual chip 101 data outputs SDOUT are not in any way tied together before connecting to the controller 102. Unique address determination is still performed using SCIN and SCOUT.

According to a disclosed class of innovative embodiments, there is provided: a multiple-device subsystem, comprising a plurality of devices connected to receive clock and/or data signals over signal lines; wherein said devices also comprise address activation control pins which are connected to define a daisy-chain relationship; wherein, under at least some conditions, when one of said devices receives an active signal at said address activation control pin, said device automatically determines a respective address for itself which is unique among all said devices.

According to another disclosed class of innovative embodiments, there is provided: a multi-device subsystem, comprising: a plurality of devices, each having at least one clock input, at least one strobe-input pin, and at least one strobe-output pin, each said device clocking the state of said strobe-input pin through to said strobe-output pin when activated at said clock input, said devices being interconnected with said strobe-input and strobe-output pins jointly defining a daisy-chain relationship; wherein, in at least one logic state, each said device will determine its own address whenever an active state is received at said respective strobe-input pin thereof; whereby, in said one logic state, said devices will successively determine their own addresses as said active state is passed along the chain of said strobe-input pins.

According to another disclosed class of innovative embodiments, there is provided: a multi-device subsystem, comprising: a plurality of optical sensor devices, each connected to receive clock and data signals over signal lines, said clock and data signals being transmitted in a serial format, said devices being interconnected at address activation control pins to jointly define a daisy-chain relationship; wherein, in at least one logic state, each said device will determine its own unique address whenever an active state is received at said respective address activation control pin thereof; whereby, in said one logic state, said devices will successively determine their own said unique addresses as said active state is passed along the chain of said address activation control pins.

According to another disclosed class of innovative embodiments, there is provided: a method for controlling a multi-device subsystem, comprising the step of: connecting a plurality of devices to receive clock and data signals over signal lines, said clock and data signals being transmitted in a serial format; wherein said devices comprise address activation control pins for determining respective device addresses, and which are connected to define a daisy-chain relationship; wherein upon being activated at said address activation control pin, said device address is determined, and is unique among all said devices.

According to another disclosed class of innovative embodiments, there is provided: a method for controlling a multi-device subsystem, comprising the step of: connecting a plurality of devices, each having at least one clock input, at least one strobe-input pin, and at least one strobe-output pin, each said device clocking the state of said strobe-input pin through to said strobe-output pin when activated at said clock input, said devices being interconnected with said strobe-in and strobe-out pins jointly defining a daisy-chain relationship; wherein, in at least one logic state, each said device will determine its own address whenever an active state is received at said respective strobe-in pin thereof; whereby, in said one logic state, said devices will successively determine their own addresses as an active state is passed along the chain of said strobe-in pins.

According to another disclosed class of innovative embodiments, there is provided: a method for controlling a multi-device subsystem, comprising the step of: connecting a plurality of optical sensor devices to receive clock and data signals over signal lines, said clock and data signals being transmitted in a serial format, said devices being interconnected at address activation control pins to jointly define a daisy-chain relationship; wherein, in at least one logic state, each said device will determine its own unique address whenever an active state is received at said respective address activation control pin thereof; whereby, in said one logic state, said devices will successively determine their own said unique addresses as said active state is passed along the chain of said address activation control pins.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

It should also be noted that, over time, an increasing number of functions tend to be combined into a single chip. The disclosed inventions can still be advantageous even with different allocations of functions among chips, as long as the functional principles of operation described above are still observed.

For another example, within the constraints well-known to those of ordinary skill, the disclosed innovative technique is not restricted to for linear arrays, but may also be applied to area arrays.

What is claimed is:

1. A multiple-device subsystem, comprising:
   a plurality of devices, each device having a data input pin, a data output pin, a clock input pin, a strobe-input pin, and a strobe-output pin, the data input pin and the clock input pin, wherein the data input and the clock input pins are connected to receive clock and data signals over signal lines;
   wherein said strobe-input and strobe-output pins are connected to define a daisy-chain relationship between each of said plurality of devices;
   wherein, under at least some conditions, when one of said devices receives an active signal at said data input pin, said device automatically determines a respective address for itself which is unique among all said devices.

2. The circuit of claim 1, wherein said devices also have data outputs pins thereof all connected together in parallel.

3. The circuit of claim 1, wherein said clock and data signals are received in a serial format.

4. The circuit of claim 1, wherein said devices also have data inputs pins thereof all connected together in parallel.

5. The circuit of claim 1, wherein said addresses of devices are determined when a reset command is first broadcast, followed by a determine-address command.

6. The circuit of claim 1, wherein each said device connects to signal lines which are serial communication lines, and which comprise a single input line and a single output line.

7. The circuit of claim 1, wherein each said device comprises a register which stores said respective address thereof when the strobe-input pin is in at least one logic state.

8. The circuit of claim 1, wherein said signal lines comprise one serial input line for all devices in said subsystem and one serial output line for every two devices in said subsystem.

9. The circuit of claim 1, wherein said devices are optical sensor chips.

10. A multi-device subsystem, comprising:

a plurality of devices, each having at least one register, at least one clock input, at least on data input pin, at least one data output pin, at least one strobe-input pin, and at least one strobe-output pin, each said device clocking the state of said strobe-input pin through to said strobe-output pin when activated at said clock input, said devices being interconnected with said strobe-input and strobe-output pins jointly defining a daisy-chain relationship;

wherein, in at least one logic state, each said device will, determine its own address whenever an active state is received at said respective data input pin thereof;

wherein, in said one logic state, said devices will store said respective address within said register whenever said active state is received at said respective strobe-input pin;

whereby, in said one logic state, each of said devices will successively store their own addresses as said active state is passed along the chain of said strobe-input pins.

11. The circuit of claim 10, wherein said devices also have data outputs thereof all connected together in parallel.

12. The circuit of claim 10, wherein said devices also have data inputs thereof all connected together in parallel.

13. The circuit of claim 10, wherein each said address is unique.

14. The circuit of claim 10, wherein said one logic state occurs when a reset command is followed by a determine-address command.

15. A multi-device subsystem, comprising:

a plurality of optical sensor devices, each having at least one register, at least one clock input, at least on data input pin, at least one data output pin, at least one strobe-input pin, and at least one strobe-output pin, each said device connected to receive clock and data signals over signal lines, said clock and data signals being transmitted in a serial format, said devices being interconnected at said strobe-input and strobe-output pins to jointly define a daisy-chain relationship;

wherein, in at least one logic state, each said device will determine its own unique address whenever an active state is received at said respective data input pin thereof;

whereby, in said one logic state, said devices will successively store their own said unique addresses in said register as said active state is passed along the chain of said strobe-input and strobe-output pins.

16. The circuit of claim 15, wherein said devices also have data outputs thereof all connected together in parallel.

17. The circuit of claim 15, wherein said devices also have data inputs thereof all connected together in parallel.

18. The circuit of claim 15, wherein said signal lines comprise one serial input line for all devices in said subsystem and one serial output line for every two devices in said subsystem.

19. The circuit of claim 15, wherein said optical sensor device uses a common serial digital input for all said optical sensor devices of said subsystem.

20. The circuit of claim 15, wherein said devices are grouped in pairs of odd and even addresses with the respective data outputs of said pairs being connected to a common output line.

21. A method for controlling a multi-device subsystem, comprising the step of:

connecting a plurality of devices, each having a register, a data input pin, a data output pin and a clock input pin, said plurality of devices to receive clock and data signals over signal lines, said clock and data signals being transmitted in a serial format;

wherein said devices comprise data input pins for determining respective device addresses;

wherein said devices comprise strobe-input and strobe-output pins for determining when said respective device addresses are stored in said respective register, and said strobe-input and strobe-output pins connected to define a daisy-chain relationship;

wherein upon being activated at said data input pin, said device address is determined, and is unique among all said devices.

22. The method of claim 21, wherein said devices also have data outputs thereof all connected together in parallel.

23. The method of claim 21, wherein said devices also have data inputs thereof all connected together in parallel.

24. The method of claim 21, wherein said signal lines comprise one serial input line for all devices in said subsystem and one serial output line for every two devices in said subsystem.

25. A method for controlling a multi-device subsystem, comprising the step of:

connecting a plurality of devices, each having at least one register, at least one clock input, at least on data input pin, at least one data output pin, at least one strobe-input pin at least one strobe-input pin, and at least one strobe-output pin, each said device clocking the state of said strobe-input pin through to said strobe-output pin when activated at said clock input, said devices being interconnected with said strobe-in and strobe-out pins jointly defining a daisy-chain relationship;

wherein, in at least one logic state, each said device will determine its own address whenever an active state is received at said respective data input pin thereof;

wherein, in said one logic state, said devices will store said respective address within said register whenever said active state is received at said respective strobe-input pin;

whereby, in said one logic state, said each of said devices will successively store their own addresses as an active state is passed along the chain of said strobe-in pins.

26. The method of claim 25, wherein said devices also have data outputs thereof all connected together in parallel.

27. The method of claim 25, wherein said devices also have data inputs thereof all connected together in parallel.

28. The method of claim 25, wherein said addresses of devices are determined when a reset command is first broadcast, followed by a determine-address command.

29. The method of claim 25, wherein said signal lines comprise one serial input line for all devices in said subsystem and two serial output lines for two devices in said subsystem.

30. A method for controlling a multi-device subsystem, comprising the step of:

connecting a plurality of optical sensor devices, each having at least one register, at least one clock input, at least on data input pin, at least one data output pin, at least one strobe-input pin, and at least one strobe-output pin, each said device connected to receive clock and data signals over signal lines, said clock and data signals being transmitted in a serial format, said devices being interconnected at strobe-input and strobe-output pins to jointly define a daisy-chain relationship;

wherein, in at least one logic state, each said device will determine its own unique address whenever an active state is received at said respective data input pin thereof;

whereby, in said one logic state, said devices will successively store their own said unique addresses in said register as said active state is passed along the chain of said strobe-input and strobe-output pins.

31. The method of claim 30, wherein said devices also have data outputs thereof all connected together in parallel.

32. The method of claim 30, wherein said devices also have data inputs thereof all connected together in parallel.

33. The method of claim 30, wherein said addresses of devices are determined when a reset command is first broadcast, followed by a determine-address command.

* * * * *